United States Patent [19]

Glick

[11] Patent Number: 5,293,273
[45] Date of Patent: Mar. 8, 1994

[54] VOICE ACTUATED RECORDING DEVICE HAVING RECOVERY OF INITIAL SPEECH DATA AFTER PAUSE INTERVALS

[75] Inventor: Gene S. Glick, Pleasantville, N.Y.

[73] Assignee: Touchstone Applied Science Associates, Inc., Brewster, N.Y.

[21] Appl. No.: 946,040

[22] Filed: Sep. 15, 1992

Related U.S. Application Data

[63] Continuation of Ser. No. 574,210, Aug. 28, 1990, abandoned.

[51] Int. Cl.$^5$ .............................................. G11B 5/00
[52] U.S. Cl. ................................................ 360/5; 360/7
[58] Field of Search ................ 360/5, 8, 7; 379/80; 358/906; 370/83

[56] References Cited

U.S. PATENT DOCUMENTS

| | | | |
|---|---|---|---|
| 3,711,650 | 1/1973 | Kuhn et al. | 370/83 |
| 4,125,865 | 11/1978 | Mohammadioun | 360/32 |
| 4,130,739 | 12/1978 | Patten | 360/8 X |
| 4,376,874 | 3/1983 | Karban et al. | 360/8 X |
| 4,807,179 | 2/1989 | Clere et al. | 360/5 X |
| 4,893,197 | 1/1990 | Howells et al. | 360/8 |
| 4,931,878 | 6/1990 | Takei et al. | 358/906 |

*Primary Examiner*—Donald Hajec
*Assistant Examiner*—Won Tae C. Kim
*Attorney, Agent, or Firm*—Leo Zucker

[57] ABSTRACT

Informational data is efficiently recorded on a recording medium in response to an input signal containing information and pauses of different intervals. Information following each pause is captured for recording and space occupied on the recording medium for recording of the pauses is minimized. A stream of input data corresponding to the input signal is supplied by operation of a controller selectively to a first buffer and a second buffer arrangement. The input signal is also coupled to a record signal generating circuit that produces a record signal in response to an input signal having information of a certain duration, and produces a no-record signal in response to a pause in the input signal of a determined interval. The controller operates to store the supplied data at selected addresses from an initial address to a last address of the first buffer before a record signal is produced, and to recirculate data storage from the initial address to the last address after data is stored at the last address and the record signal generating circuit continues to output a no-record signal. When a record signal is produced, data from the first buffer is read out for recording prior to reading out of data from the second buffer. The controller also deletes from the buffered data, before recording, data corresponding to a pause in the input signal for the determined interval needed for the record signal generating circuit to switch from a record to a no-record signal output.

15 Claims, 3 Drawing Sheets

VOICE ACTUATED RECORDING DEVICE HAVING RECOVERY OF INITIAL SPEECH DATA AFTER PAUSE INTERVALS

This application is a continuation of application Ser. No. 07/574,210, filed Aug. 28, 1990, now abandoned.

BACKGROUND OF THE INVENTION

1. Field of the Invention

The present invention relates generally to voice actuated recording devices, and more particularly to a voice operated (VOX) recording device in which speech data that might be lost from recording due to time delays in the VOX circuitry and other recording components of the device, is recovered and stored for recording in proper sequence with speech sounds which follow after the VOX circuitry signals the device to record.

2. Description of the Known Art

Recording devices are used to capture various data including speech in analog or digital form. The data is permanently recorded on media such as magnetic tape. Several different methods of recording are possible. First, the recording device can be left in an ON state over a relatively long time during which an event to be recorded may occur. Second, if the operator of the device knows that an event to be recorded is about to happen, for example, someone giving dictation knows that he or she is about to speak, the person can manually start the recording device before speaking by operating a record button and setting the device in an ON state early enough to capture all of the speech. Third, some kind of automatic start and stop feature responsive to the presence of speech, e.g., VOX control, can be embodied in the recording device.

The first mentioned recording method has the obvious disadvantage that the recording device might be set in an operating state over a time substantially longer than that during which any speech is present. Once incident on the device, however, the speech will be captured in its entirety on the recording medium. This method therefore gives rise to a great deal of wasted media if the speech events are only occasional, with less waste as the speech becomes more continuous.

In the second method—manual operation of the recording device—the operator must be sure to set the device in an ON state before commencing speech. If done properly, the recording media will be used much more efficiently in terms of blank or wasted space.

In the third method of recording mentioned above, a sensor arrangement known as voice operated switch or a VOX is used to detect the speech and, once detected, sets the recording device in an ON state by outputting a VOX speech detection signal. The media is used efficiently in that pauses greater than the cut-off time for the speech detection signal are not recorded. Upon playback, the listener need not wait through a number of long pause intervals.

Accordingly, the most efficient use of recording media for dictation and other speech applications entails automated ON-OFF control of the recording device, wherein the device records only upon the presence of speech. VOX circuitry can be used to accomplish such automation. There are, however, problems associated with the conventional VOX actuated recording devices. Specifically, in a typical speech recording device such as a tape recorder, a length of magnetic tape is driven by a mechanical motor. The motor drives the tape up to an operating speed so that proper recording can take place. Using the VOX speech detection signal as a means for starting the motor therefore has the disadvantage that speech present before the speech detection signal is produced will not be recorded at the beginning of the recorded data. Yet, this initial speech includes the beginning sounds of words and usually contains critical phonemes. If this speech is lost from recording, it may be impossible for the listener during playback to comprehend the initial part of the recording. In other words, VOX circuitry must respond to the presence of speech in order to actuate the drive motor, but since the VOX has an inherent finite time delay, and since the drive motor does not come up to speed instantaneously, a time lag between the beginning of speech and the recording of the speech is created. The portion of the speech omitted from recording corresponds to this time lag.

Further, when speech is completed or a relatively long pause is taken between words and sentences, the VOX ceases to produce an output signal and the drive motor is stopped. Again, there is a finite response time for the VOX to cut off its output signal once speech is no longer present. That portion of the record media which continues to be driven over this response time is wasted since no speech is being recorded. Finally, VOX circuitry may switch ON and OFF during a sentence or word, instead of between sentences and pauses. By causing the tape drive to be turned OFF and back ON quickly, some of the speech may be lost from recording.

U.S. Pat. No. 4,893,197 issued Jan. 9, 1990, discloses sound recording apparatus in which pauses during speech to be recorded are compressed into the form of pause length data bytes, so as to minimize waste of recording media. The patented apparatus does not use a VOX arrangement for controlling the speech recording process, but instead remains in an "on" state all the time. An input analog audio signal is converted to digital form and loaded at successive addresses in a temporary store. Pauses of more than a certain length are detected and their lengths are encoded. Data corresponding to the encoded pause length is then loaded in the temporary store at an appropriate address, and additional addresses of the temporary store are not written until an end of each pause is detected. The data structure of the recording apparatus of the '197 patent is therefore comprised of simple speech data bytes and specially encoded pause length data bytes. It will be appreciated that such a data structure requires substantial central processing unit (CPU) resources to create during record, and to decode, upon a playback operation.

SUMMARY OF THE INVENTION

An object of the invention is to overcome the above and other shortcomings of voice actuated recording devices.

Another object of the invention is to provide a voice actuated recording device in which initial speech signals that contain distinguishing phonemes and other important information will not be lost upon recording and subsequent playback.

Yet another object of the invention is to provide a speech recording device in which a conventional VOX may be used to detect the presence of speech and in which initial speech signals that are present before the VOX signals a speech condition, are captured and recorded.

According to the invention, a data recording system for efficiently recording signals containing information and pauses of different intervals, wherein information following each pause is captured for recording and space occupied on a recording medium for recording of the pauses is minimized, comprises input means for supplying an input signal containing information to be processed for recording on the recording medium, processor means coupled to the input means for supplying a stream of input data corresponding to the input signal, and storage means including first buffer means and second buffer means coupled to the processor means for storing data supplied by the processor means.

Control means coupled to the processor means and the storage means operates to control a sequence of operations of the recording system and to enable the storing of data in and out of selected addresses of the first and the second buffer means. The system also includes record signal generating means having an input coupled to the input means and an output, for producing a record signal in response to an input signal having information of a certain duration and for producing a no-record signal in response to a pause in the input signal of a determined interval, said output being coupled to an input of the control means, and the first buffer means has a storage capacity corresponding to said information of a certain duration.

The control means includes first means for storing data supplied from the processor means at selected addresses from an initial to a last address of the first buffer means before a record signal is produced by the record signal generating means, including means for recirculating data storage from the initial address to the last address after data is stored at the last address and the record signal generating means continues to output a no-record signal; second means for reading out data stored in the first buffer means after a record signal is produced, third means for storing data supplied from the processor means at selected addresses of the second buffer means after a record signal is produced, fourth means for reading out data stored in the second buffer means following the data read out from the first buffer means, fifth means for returning data storage to the control of the first means when the recording signal from the record signal generating means changes from a record to a no-record signal, sixth means for measuring lengths of pauses in buffered data in the storage means and for encoding the pause lengths at corresponding positions in the data for recording on the recording medium, and seventh means for deleting from the buffered data, before recording, data corresponding to a pause in the input signal for said determined interval when the signal from the record signal generating means changes to a no-record signal.

According to another aspect of the invention, a method of efficiently recording signals containing information and pauses of different intervals, whereby information following each pause is captured for recording and space occupied on a recording medium to record the pauses is minimized, comprises the steps of supplying an input signal containing information to be processed for recording on a recording medium, processing the input signal to produce a stream of input data corresponding to the input signal, coupling the input signal to record signal generating means thereby producing a record signal in response to an input signal containing information of a certain duration and producing a no-record signal in response to a pause in the input signal of a determined interval, and providing storage means including first buffer means with a data storage capacity corresponding to the information of a certain duration, and second buffer means.

The method also includes first controlling the first buffer means to store the stream of input data before a record signal is produced and to read out the data stored in the first buffer means after a record signal is produced, second controlling the second buffer means to store the stream of input data after a record signal is produced and to read out data stored in the second buffer means following the data read out from the first buffer means, returning to the first controlling step when the record signal from the record signal generating means changes to a no-record signal, measuring lengths of pauses in buffered data in the storage means and encoding the pause lengths at corresponding positions in the data for recording on the recording medium, and deleting from the buffered data, before recording, data corresponding to a pause in the input signal for said determined interval when the signal from the record signal generating means changes to a no-record signal.

According to another aspect of the invention, a recording system for efficiently recording signals containing speech information including pauses of different intervals, comprises input means for supplying a speech signal containing speech information and pauses of different intervals, with processor means for supplying a stream of speech data corresponding to the speech information and pause data corresponding to the pauses of different intervals. Storage means coupled to the input means stores data supplied by the processor means, and control means coupled to the input means and to the storage means includes address and read/write enable means for controlling a sequence of operations of the recording system, and for enabling storing and reading of data in and out of selected addresses of the storage means. Record means coupled to the control means and to the storage means transfers speech data read out of the storage means for recording on a recording medium, wherein the control means comprises means for measuring lengths and positions of the pauses in the supplied speech information, including pause indexing means responsive to the pause data for producing flags corresponding to a position and a length of each of the pauses in association with a file of speech data recorded on the recording medium.

According to another aspect of the invention, a method of efficiently recording signals containing speech information including pauses of different intervals, comprises the steps of supplying a speech signal containing speech information and pauses of different intervals, processing the speech signal to produce a stream of speech data corresponding to the speech information and pause data corresponding to the pauses of different intervals, providing storage means, controlling the storage means to store and to read data in and out of selected addresses of the storage means, transferring speech data read out of the storage means for recording on a recording medium, measuring lengths and positions of pauses in the supplied speech signal according to the pause data, and producing flags corresponding to a position and a length of each of the pauses in association with a file of speech data recorded on the recording medium.

For a better understanding of the present invention, together with other and further objects, reference is made to the following description taken in conjunction with the accompanying drawing, and the scope of the invention will be pointed out in the appended claims.

DETAILED DESCRIPTION OF THE INVENTION

Figure 1:
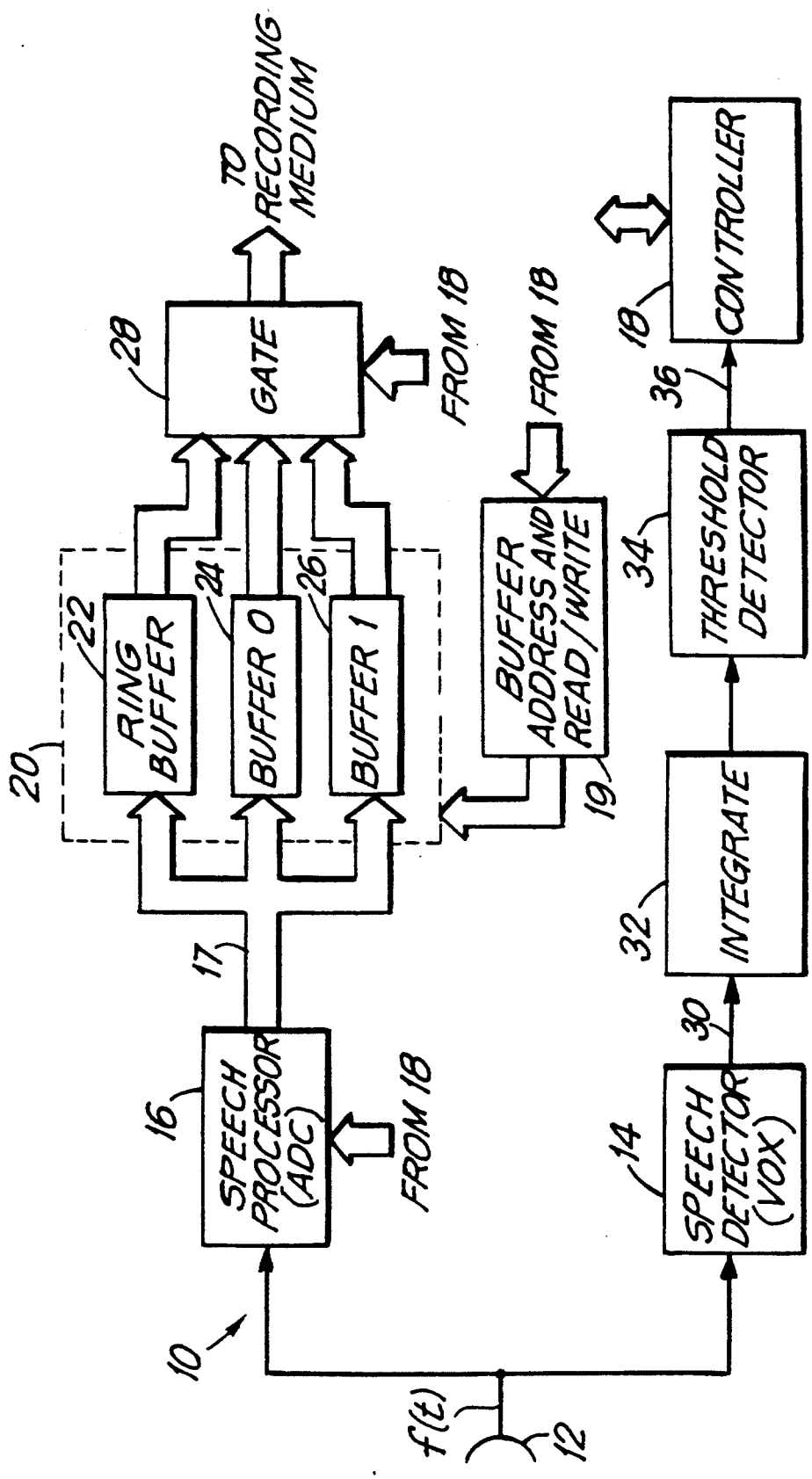
FIG. 1 is a schematic block diagram of a voice operated (VOX) speech recording device according to the invention.

FIG. 1 is a schematic block diagram of voice actuated speech recording device 10 according to the invention.

Speech to be recorded during, for example, a period of dictation is incident upon a microphone element 12 and transformed into electrical speech signals f(t) corresponding to the spoken words. The signal f(t) is simultaneously monitored by a speech detector circuit 14 which can be a conventional VOX circuit, and by an optional speech processor 16 for performing a desired operation on the signals f(t) prior to their being recorded on a recording medium. For example, speech processor 16 may convert the analog signals f(t) into digital form as represented at 17 in FIG. 1, and perform digital signal processing such as filtering and/or removing noise from the speech signal f(t).

The sequence of operation of the various components of the recording device 10 are controlled by controller 18 which may include a central processing unit (CPU), a read-only-memory (ROM) in which an operating program for the device 10 is permanently stored, one or more random access memories (RAMs), and various input-output (I/0) devices such as may be necessary to interface the controller 18 with other components of the recording device 10.

In the illustrated embodiment, speech data bytes output at 17 from the speech processor 16 are loaded into storage means 20 under the control of a buffer address and read/write stage 19 associated with controller 18. Storage means 20 is comprised of a ring buffer 22, and two larger capacity buffers 24, 26 of equal size. Speech data stored in the three buffers 22, 24, 26 is read out at a controlled timing via the buffer address and read/write stage 19 into a gate network 28 the output of which comprises speech data to be recorded on the recording medium. The recording medium may comprise, for example, a magnetic disk storage arrangement in a personal computer (PC).

The speech detector or VOX circuit 14 produces an output speech detection signal 30 when the input speech signal f(t) exceeds a preset level. As mentioned, VOX circuit 14 has a certain inherent response time prior to signaling of a speech condition. Also, after relatively long pauses such as between sentences and paragraphs, the speech detection signal 30 is no longer output by VOX circuit 14.

Speech detection signal 30 is input to an integrate circuit 32 the output of which is supplied to a threshold detector circuit 34. Threshold detector 34 generates a record signal 36 which is input to the controller 18 once the integrated speech detection signal exceeds a certain threshold. As discussed below, all speech incident on the microphone element 12 prior to generation of the record signal 36 is recovered and stored in the ring buffer 22 of the storage means 20. Thus, this initial speech data is captured by the device 10 for recording on the recording medium.

The storage means 20, integrate circuit 32 and threshold detector 34 together form what may be referred to as a "recording switch modifier" (RSM). The RSM is two-part. One part, the integrate circuit 32 and threshold detector circuit 34, takes the speech detection signal 30 output from an ordinary speech detector or VOX circuit 14 and processes the signal. The other part, i.e., storage means 20 employs a buffering arrangement to store speech data prior to permanent recording. The RSM therefore operates in parallel with respect to a stream of speech data. The output record signal 36 serves to control the gate network 28 or equivalent switch via controller 18 for enabling a permanent recording of the speech data. The buffering arrangement of the storage means 20, and any time delays inherent in the speech processor 16, create a time delay between the incidence of speech on the microphone element 12 and its permanent recording. Speech data is continuously recorded into the ring buffer 22 of storage means 20. As more data is input, it is loaded into the ring buffer 22 until full. If the buffer 22 becomes full before the RSM generates the record signal 36, the oldest data is discarded as new data is written in. The operation is therefore of a first-in first-out kind similar to a queue in a computer. Once the RSM produces the record signal 36, speech data is enabled to pass through the gate network 28 to be properly recorded on the recording medium. Speech data which would otherwise be lost prior to signaling of the VOX circuit 14, is therefore captured by ring buffer 22.

In a system where digitized speech is generated by speech processor 16 or from some other source at a sample rate of 8,000 samples/second (telephone quality), ring buffer 22 may have, for example, a capacity of 2000 bytes. This storage capacity corresponds to a maximum time delay of 0.250 seconds. A range of possible time delays has been found to be from about 0.1875 to about 0.320 seconds for high telephone quality. Smaller time delays will definitely clip data, while longer delays will waste some media. Other constants depend on the application.

In summary, operation of the RSM portion of the recording device 10 is as follows. Taking the output of a VOX circuit 14, the speech detection signal 30 is processed so as to produce the record signal 36 after a predetermined time delay. This is accomplished by integrating the speech detection signal 30 over time, and then passing the integrated signal to the threshold detector 34. As is known, the VOX circuit 14 provides a logical true or false condition (logic 1=no speech, and logic 0=speech) as speech signals are input. Integrating the logical speech detection signal 30 over time during a "no-speech" condition results in an integrated logical 1 signal. Upon incidence of speech, the VOX circuit 14 toggles back and forth between "speech" and "no-speech" (logical 0 and 1). Integrating this signal over time during the course of speech results in a time averaged signal value between the "speech" and "no-speech" signal values. The integrated signal is supplied to the threshold detector circuit 34 which determines whether or not the record signal 36 should be generated.

Figure 2:
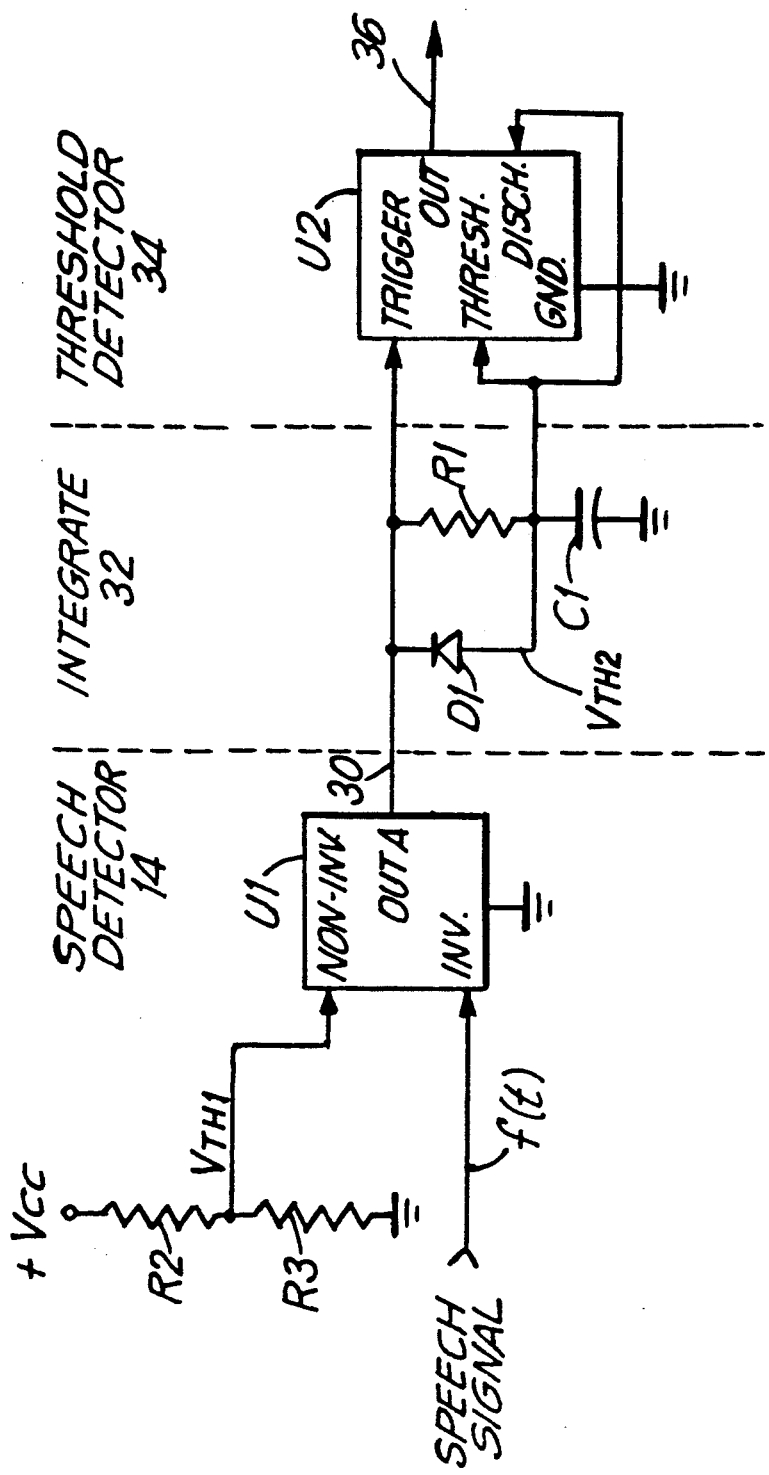
FIG. 2 is a schematic diagram of a VOX circuit and record signal generating means shown in FIG. 1.

FIG. 2 is a schematic diagram of the speech detector circuit 14, integrate circuit 32 and threshold detector circuit 34.

The speech detector or VOX circuit 14 may be constructed from a conventional operational amplifier such as an IC type 1458 (U1) operating in a non-linear mode. The output of U1 (OUT A) is therefore either +5 volts, or −5 volts. When no speech signal f(t) is present speech detection signal 30 is at +5 volts as set by the equation V (detect)=10,000×(VTH1−V speech). A threshold voltage (VTH1) is set by resistors R2 and R3. As the incoming speech signal f(t) reaches the threshold voltage, the output of U1 shifts from +5 to −5 volts. When the signal falls below the threshold, the output shifts back from −5 to +5 volts.

The output speech detection signal 30 is supplied to the integrate circuit 32 comprised of resistor R1, capacitor C1 and diode D1. Capacitor C1 charges through resistor R1 by the positive voltage detection signal 30, i.e., a "no speech" signal of +15 volts. If the signal 30 falls below VTH2, diode D1 opens and capacitor C1 discharges directly into U1. The effect of the charging and the discharging of capacitor C1 is to average the speech detection signal 30 over time so that it will approach 0 volts while a person is speaking, and +5 volts during a no-speech condition. Threshold detector circuit 34 may comprise a conventional IC type 555 timing chip (U2) used to monitor the voltage VTH2. As is known from the conventional operating parameters for the type 555 IC, as long as its threshold pin input VTH2 is above the threshold voltage $\frac{2}{3} \times 5$ volts, the output record signal 36 is low. When the voltage VTH2 falls below this threshold voltage, the output record signal 36 switches high.

Thus, according to the combined circuitry of FIG. 2, when speech detector or VOX 14 signals a no-speech condition, the detection signal 30 is high so as to charge capacitor C1 beyond the threshold voltage, and U2 is set low to indicate a "no-record" state. When a signal is present, capacitor C1 averages the output of the VOX (U1) which, upon lowering to the threshold voltage, sets U2 to a "record" state. When the signal goes from "speech" to "no-speech", the capacitor C1 charges slowly (set by R1 and C1) to the threshold voltage which allows a small period of time before the output of U2 goes low again. This period of time is that which keeps the circuit from changing states during relatively small pauses between spoken words and phrases.

Figure 3:
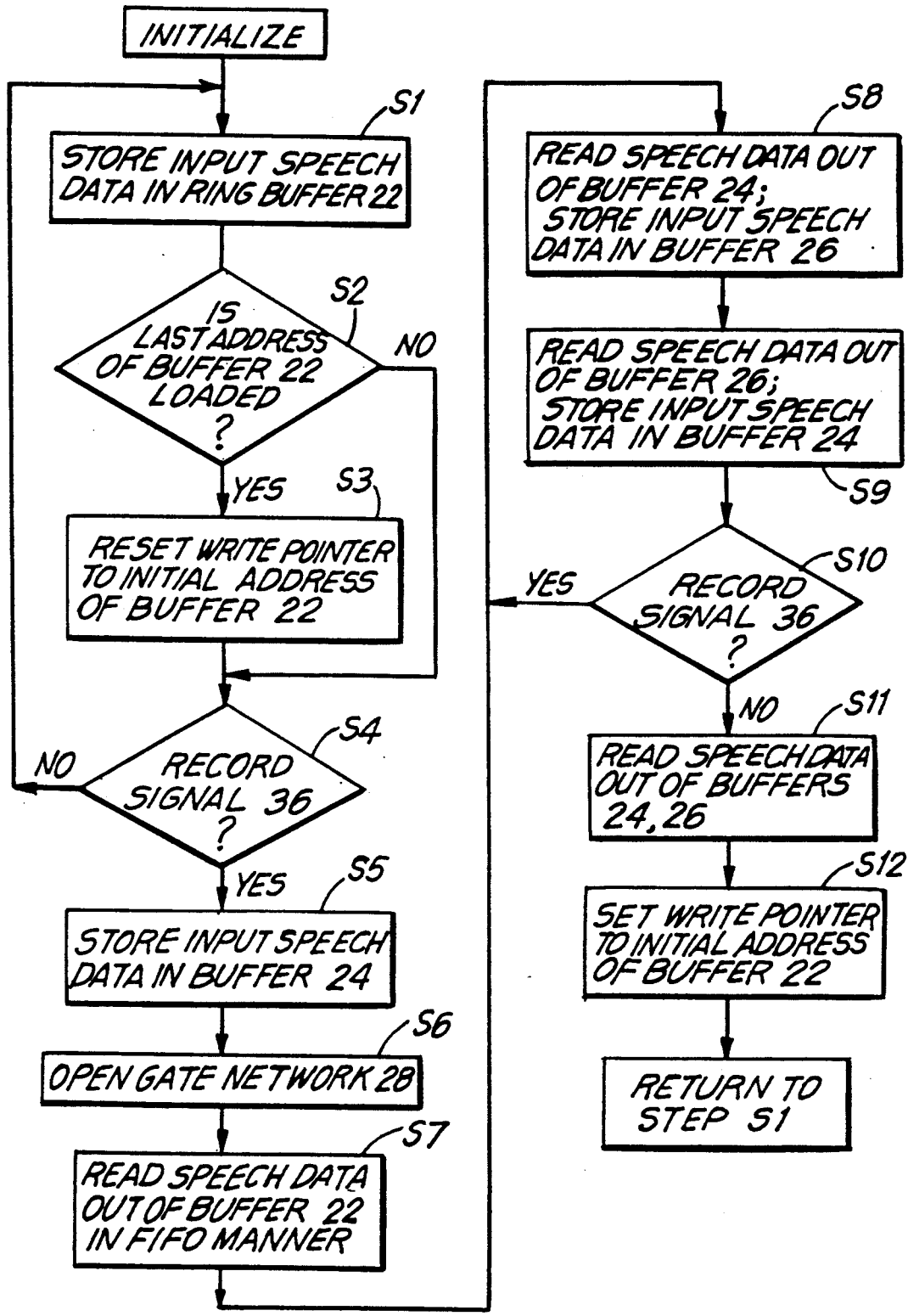
FIG. 3 is a flow chart illustrating operational steps in the recording device of FIG. 1.

The implementation of buffering in the storage means 20 in FIG. 1 is now discussed in further detail, with reference to the flow chart of FIG. 3.

When the speech signals f(t) are converted into digital form at 16, a data stream representing digitally processed speech data bytes is generated. As the bytes become available, they are written into the storage means 20 which comprises the ring buffer 22, and larger buffers 24, 26. Ring buffer 22 is used only to buffer the data prior to the signaling of a record state by the threshold detector 34. See steps S1 to S4. The buffers 24, 26 are of larger capacity and are used to capture data before being written to a recording medium such as, e.g., a magnetic disk in a PC. The data is stored in the three buffers in a rotating fashion. As each data byte is read into the storage means 20, a write pointer is incremented to a next address location. The pointer is used to instruct the CPU of the controller 18 as to where the next speech data byte is to be written, and is functionally equivalent to "pushing" data along a queue.

If the pointer indicates a last available address of the ring buffer 22 before a record signal 36 is loaded, the pointer is returned to the beginning or first address of the ring buffer 22. (Step S3). Once a record signal 36 is produced (S4), the write pointer is moved to a first address for the buffer 24, and speech data is then written into buffer 24 until full. (Step S5). Once the latter buffer is filled, the pointer indicates the beginning or first address of buffer 26 into which speech data continues to be stored. The gate network 28 is then opened. (Step S6). Prior to writing of the contents of buffer 24 onto the recording medium, however, the contents of the ring buffer 22 which contains speech data prior to signaling of a "record" condition by threshold detector circuit 34, must be included. Accordingly, prior to reading out of the contents of buffer 24 to the recording medium, the contents of ring buffer 22 are unloaded in a first-in first-out manner through the gate network 28 (Step S7), followed by the contents of buffer 24. (Step S8).

Once buffer 26 is filled with speech data bytes, the pointer is then moved back to indicate the first address of buffer 24 for writing of new speech data while buffer 26 is unloaded through gate network 28. (Step S9). Input speech data is stored in buffer 24 until full, and then switched to buffer 26 while the contents of buffer 24 are read out to be recorded through the gate network 28.

When the threshold detector circuit 34 signals a "no-record" condition (S10), the remaining contents of the buffers 24, 26 are read out and the pointer is then set to indicate the first address of the ring buffer 22. The process then returns to step S1.

The above described RSM portion of the recording device 10 thus avoids wasting of recording media when a flow of speech ends. If the RSM signals "no-record" via threshold detector circuit 34, a small amount of buffered data corresponding to the "off" time delay of the RSM can be deleted. If a co-processor or very fast processor is included in the overall system, it could monitor the buffered speech data stream and determine whether or not the data represents a pause or a true end of speech. If the processor is fast enough, real-time pauses that are not dropped by operation of the RSM can be flagged and removed. Even apart from such real-time processing of pauses, the RSM will detect an end of speech via the threshold detector circuit 34, and relatively little recording media will be wasted. The RSM nonetheless allows for a post hoc analysis of pauses.

In order to recreate an original message as spoken, pauses can be detected and reinserted upon playback. The pause lengths and positions may be measured during recording, and encoded on the recording medium. When playing back a recording, the speech is played until a previously marked pause is encountered, and "blanks" are played for the measured time duration of the pause. Such capability is important for purposes of editing and purposeful exaggeration of pauses during speech to parse speech.

By marking a recorded file of speech data for pauses, editing can be facilitated. If one requires that a pause be deleted or lengthened, such can be easily accommodated. Such pause marks also provide convenient locations for tabbing through a file for insertions and deletions. If a person while dictating speech follows a simple set of rules in forming pronounced pauses, it will not be necessary, for example, to say "paragraph" or "stop".

The recording device 10, as disclosed herein, uses a combination of analog and digital technology. The VOX 14 monitors the analog speech signal f(t) and produces an analog speech detection signal 30. The integrate circuit 32 monitors the VOX output and also produces an analog integrated speech detection signal. The threshold detector circuit 34 senses the integrated detection signal 30 and produces a logical record/no-record output signal. The buffers 22, 24, 26 of the storage means 20 are shown in a digital form. While the presently disclosed arrangement is an analog/digital mix, it will be appreciated that it can be realized in strictly analog or in strictly digital form.

For example, an analog implementation allows the VOX, integrate and threshold detector circuits to remain as disclosed. Instead of processing the speech signals f(t) into a data byte stream and using digital memory devices, the storage means 20 may be in the form of an analog delay line. The recording medium can be in the form of magnetic tape as with tape recorders, or optical media as in laser recordings.

An all digital implementation would require the VOX, integrate and threshold detector circuits of FIG. 2 to be implemented via digital technology. The VOX circuit 14 would monitor digitized speech rather than analog and can be implemented via an algorithm which operates on the speech data, wherein a VOX output would be computed by a processor. Similarly, the integrate and threshold detector circuits 32, 34 could be implemented by a processor programmed to carry out the same functions as the analog circuits disclosed.

To play back messages recorded via the present recording device 10 onto a recording medium, one need keep track only of the number of bytes written during recording or, if the RSM signals a "no record" state, the number of bytes read in but not saved. During playback, the data saved may be played back until the number of bytes associated with that packet is played. Then, a number of blanks associated with the number of bytes counted during the pause period may be inserted. If selected, this operation is repeated until the original file is played back as it was recorded. Alternatively, during playback, pauses can be exaggerated for purposes of, for example, language instruction.

Compression of speech data pays off in a direct savings of recording media. In digital systems where media is expensive, any savings of storage represents a direct savings in cost. Also, by eliminating pauses, a user is spared from listening to the pauses on playback should such pauses not provide any useful information, resulting in a reduced time needed to review the recording. Further, rather than writing on magnetic disk, compressed speech can be written to an audio tape recorder. Audio tape is useful where magnetic disk space is at a premium. By writing to audio tape, the user gains the advantage of being able to listen to the recording away from a PC.

Speech data ordinarily uses up a considerable amount of record media space. If digitized, however, speech data may be compressed prior to recording through an algorithm known as Adaptive Pulse Code Modulation (ADPCM), which is implemented via hardware. The algorithm takes 10 bit serial data and converts it to either 3 or 4 bits (software selectable). After two such samples have been taken, a single byte of data is assembled. As discussed above, the speech may be further compressed by removing pauses between sentences in order to minimize the amount of record media space used. By keeping track of the length of the pauses and their position in the record file, the stored message can be reproduced as actually spoken by inserting the pauses back into the message at playback.

Compression of the recorded speech data can be implemented in two ways—software and hardware. A software approach entails monitoring the input speech data stream at 17, and carrying out a pattern recognition of the data. By removing bytes that represent silence and keeping track of their number and position, an accurate reproduction can be made. This type of compression can be done both at run-time, or as a post process.

The presently disclosed embodiment incorporates a hardware approach to real time speech compression by use of a recording switch modifier (RSM), as well as that software necessary to read stored speech data out of the storage means 20 including the ring buffer 22 and large buffers 24, 26. At least part of the RSM may be in the form of an "add-on" board for a PC, and other parts such as the buffers 22, 24, 26 and controller 18 may reside in the PC itself.

It will be appreciated that the recording device 10 as disclosed herein provides the following features and advantages in the recording of speech:

1. The use of a recording switch modifier (RSM) which processes the output of a conventional speech detector or VOX circuit to control the start and stop of speech data storage, as well as to keep unwanted noise from being recorded.

2. Speech is compressed prior to permanent recording by removal of pauses exceeding a certain time duration, e.g., pauses between sentences.

3. The use of storage means including a ring buffer to recover initial speech bursts or data that are present just prior to the signaling of a "record" state.

4. A fully restored playback including original pauses may be obtained. Pauses may, however, be deleted or edited. The present device 10 allows for the enhancement of speech parsing. It improves dictation control by enabling a "backing up" to previous flags rather than over a fixed interval for inserting new dictation at the flag markers, and instead of having to record one larger unit of speech.

5. Transcription of speech is facilitated by enabling the forward or backward movement to flag pauses.

The RSM portion of the device 10 may be used to create a real-time recording in which speech data is compressed beyond that normally obtained with adaptive pulse code modulation algorithms. Data generated by the RSM can be interpreted in terms of pauses and can be used to compress data stored on the recording medium. Such compression may be large relative to ADPCM if the user's speech has a lot of pauses as is common when people dictate and/or record messages to some machine. In any event, the compression obtainable relative to ADPCM remains significant.

Although the present recording device and technique are described in connection with VOX circuitry that outputs a speech detection signal, it will be appreciated that the invention can be applied to operate with any VOX type circuitry that produces a detection signal a finite time after any kind of recordable information signals are present at its input, e.g., music, video, seismographic, and the like.

Further, while the disclosed embodiment incorporates digital circuit technology, it will be obvious that the present invention can be implemented in a purely analog fashion with, for example, delay lines and other suitable analog circuit technology.

While the foregoing description represents a preferred embodiment of the invention, it will be obvious to those skilled in the art that various changes and modifications may be made, without departing from the true spirit and scope of the invention as defined by the following claims.

What is claimed is:

1. A data recording system for efficiently recording signals containing information and pauses of different intervals, wherein information following each pause is captured for recording and space occupied on a recording medium for recording of said pauses is minimized, said system comprising:

input means for supplying an input signal containing information and pauses of different intervals to be processed for recording on a recording medium;

processor means coupled to said input means for supplying a stream of output data corresponding to said input signal including said pauses of different intervals;

storage means including:
   first buffer means coupled to said processor means for storing data supplied by said processor means; and
   second buffer means coupled to said processor means for storing data supplied by said processor means;

control means coupled to said processor means and including buffer address and read/write enable means associated with said first and said second buffer means, for controlling a sequence of operations of said recording system and for enabling storing and reading of data in and out of selected addresses of said first and said second buffer means;

record signal generating means having an input coupled to said input means and an output, for producing a record signal in response to an input signal having information of a certain duration, and for producing a no-record signal in response to a pause in the input signal of a determined interval, said output being coupled to an input of said control means;

said first buffer means having a storage capacity corresponding to said information of a certain duration; and wherein said control means include
   first means for storing data supplied from said processor means at selected addresses from an initial address to a last address of said first buffer means before a record signal is produced by said record signal generating means, including means for recirculating data storage from said initial address to said last address after data is stored at said last address and the record signal generating means continues to output a no-record signal, second means for reading out data stored in said first buffer means after a record signal is produced by said record signal generating means, third means for storing data supplied from said processor means at selected addresses of said second buffer means after a record signal is produced by said record signal generating means, fourth means for reading out data stored in said second buffer means following the data read out from said first buffer means, fifth means for returning data storage to the control of said first means when the record signal from said record signal generating means changes from a record to a no-record signal;

sixth means for measuring lengths of pauses in data from said processor means and for encoding the pause lengths for recording on the recording medium at corresponding positions in the recorded data, and seventh means for deleting from the data from said processor means, before recording, data corresponding to a pause in the input signal for said determined interval when the signal from said record signal generating means changes to a no-record signal.

2. A data recording system according to claim 1, including gate means coupled to said first and said second buffer means and responsive to said control means, for selectively transferring data read out of said first and said second buffer means to said recording medium.

3. A data recording system according to claim 1, wherein said second buffer means comprises a pair of buffer memories for alternatingly storing data supplied by said processor means after a record signal is produced by said record signal generating means, and for alternatingly unloading the stored data for recording on said recording medium in response to operation of said control means.

4. A data recording system according to claim 3, wherein said control means is operative to store data in a first buffer memory while unloading data from a second buffer memory, and to store data in the second buffer memory while unloading data from the first buffer memory.

5. A data recording system according to claim 1, wherein said second buffer means has a storage capacity which is greater than that of said first buffer means.

6. A data recording system according to claim 1, wherein said control means is operative to read out remaining data stored in said second buffer means when the output from said record signal generating means changes from a record to a no-record signal.

7. A data recording system according to claim 1, wherein said processor means includes means for performing an analog-to-digital conversion of the input signal.

8. A data recording system according to claim 1, wherein said control means includes compression means for compressing the data from said processor means prior to recording on the recording medium.

9. A data recording system according to claim 8, wherein said compression means includes means for compressing the data by performing adaptive pulse code modulation.

10. A data recording system according to claim 1, wherein at least some of the components of said system are provided in the form of a circuit board adapted to be operatively installed in a personal computer.

11. A data recording system according to claim 1, wherein said input means comprises a microphone element and the input signal to be processed for recording on the recording medium comprises electrical speech signals.

12. A method of efficiently recording signals containing information and pauses of different intervals, whereby information following each pause is captured for recording and space occupied on a recording medium for recording of said pauses is minimized, the method comprising the steps of:

supplying an input signal containing information and pauses of different intervals to be processed for recording on a recording medium;

processing the input signal to produce a stream of input data corresponding to the input signal including said pauses of different intervals;

coupling the input signal to record signal generating means thereby producing a record signal in response to an input signal containing information of a certain duration and producing a no-record signal in response to a pause in the input signal of a determined interval;

providing storage means including first buffer means having a data storage capacity corresponding to said information of a certain duration, and second buffer means;

first controlling the first buffer means to store the stream of input data before a record signal is produced and to read out the data stored in the first buffer means after a record signal is produced;

second controlling the second buffer means to store the stream of input data after a record signal is produced and to read out the data stored in the second buffer means following the data read out from the first buffer means, returning to said first controlling step when the record signal from the record signal generating means changes from a record to a no-record signal;

measuring lengths of pauses in the input data corresponding to the input signal and encoding the pause lengths for recording on the recording medium at corresponding positions in the recorded data; and deleting from said input data, before recording, data corresponding to a pause in the input signal for said determined interval when the signal from the record signal generating means changes to a no-record signal.

13. The method of claim 12, including controlling the second buffer means to read out remaining data stored in the second buffer means when the output of said record signal generating means changes from a record signal to a no-record signal.

14. The method of claim 12 including compressing the input data prior to recording on the recording medium.

15. The method of claim 12, including carrying out at least some of the steps by operating a personal computer.

* * * * *